INVENTORS
JAMES H. WILDE &
WALTER E. GRAVES

ATTORNEY

United States Patent Office 3,180,992
Patented Apr. 27, 1965

3,180,992
DIRECT READING NUCLEAR RADIATION
INSTRUMENT
James H. Wilde and Walter E. Graves, Clinton, Tenn.,
assignors to American Nuclear Corporation, a corporation of Tennessee
Filed Dec. 28, 1961, Ser. No. 162,703
8 Claims. (Cl. 250—83.6)

This invention relates to a nuclear radiation instrument eminently suited for detecting and measuring nuclear radiation.

Whereas a prior proposal has obviated the need for such instruments as galvanometers and milliammeters by the use of discharge devices, the present invention further simplifies the problem and renders more accurate the results by using the breakdown voltage of a discharge device as a criterion rather than relying upon a comparison of two sources of illumination. Instruments embodying the present invention are characterized by simplicity, low cost, ruggedness and dependability capable of being produced in small sizes, light in weight and requiring a minimum of maintenance.

It is among the objects of the present invention to provide a nuclear radiation instrument comprising a nuclear radiation-electrical transducer and a source of reference voltage having output terminals, a circuit containing a discharge device of predetermined breakdown voltage having an input terminal, and a circuit interconnecting the terminals containing a calibrated variable resistor for indicating output values of the transducer at which breakdown of the discharge device occurs. The transducer and source preferably have their output terminals connected additively and the breakdown voltage preferably exceeds the reference voltage. The resistor may be a potentiometer having terminals connected to the transducer and source and a variable tap connected to the discharge device circuit. The resistor may be interposed between the source terminal and a terminal common to the transducer and discharge device circuit. The discharge device is preferably a gas glow tube such as a neon tube. The discharge device circuit preferably includes a capacitor connected in parallel circuit with the discharge device and a resistor connected in series with the parallel circuit. The source of reference voltage preferably includes a circuit containing a gas glow tube to assure a constant voltage supply.

A more complete understanding of the invention will follow from a detailed description of the accompanying drawings wherein.

Figure 1:
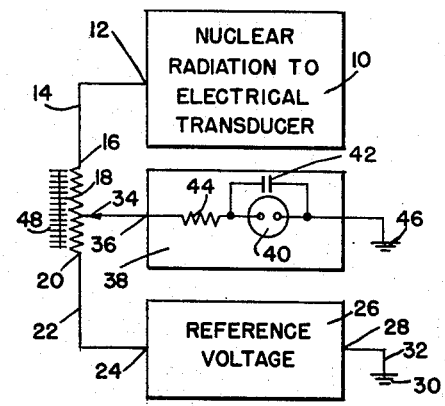
FIG. 1 is a simplified circuit diagram illustrating the invention.

The nuclear radiation-electrical transducer 10 depicted in FIG. 1 has an output terminal 12 connected by a lead 14 to a terminal 16 of a voltage divider 18 whose opposite terminal 20 is connected by a lead 22 to the output terminal 24 of a source of reference voltage 26 whose opposite terminal 28 is connected to ground 30 through a lead 32. A variable tap 34 on the voltage divider or potentiometer 18 is connected to the input terminal 36 of a discharge device circuit 38 including a discharge device 40 connected in parallel with a capacitor 42, the parallel circuit being connected in series with a resistor 44 and ground 46. The reference voltage source 26 may incorporate a neon lamp or Zener diode so as to maintain a constant value and the discharge device 40 may also assume the form of a neon lamp. The voltage divider or potentiometer 18 is provided with a calibrated scale 48 which may be linear or logarithmic to indicate the values of radiation corresponding with the current output of the nuclear radiation to electrical transducer 10. A practical range for this instrument may extend from 10 milliroentgens per hour to 100 roentgens per hour.

When the value of the reference voltage plus the voltage drop across some portion of the voltage divider or potentiometer 18 produced by a current generated in the transducer becomes equal to the discharge voltage of the gas glow tube 40, the lamp will begin to flash and will behave in the manner of a relaxation oscillator. By adjusting the position of the variable tap 34 to a point where the discharge device 40 discontinues flashing, the indication on the scale 48 can be read in terms of the intensity of radiation to which the transducer is exposed.

Figure 2:
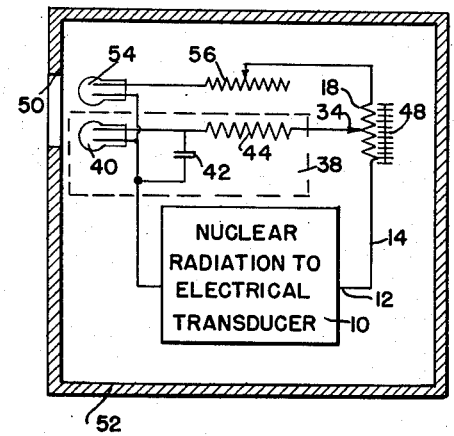
FIG. 2 is a simplified circuit diagram depicting the instrument within a housing.

In the form of the invention depicted in FIG. 2, the gas glow tube 40 is shown as positioned adjacent a window 50 provided in a housing 52 through which an observer can determine rather precisely the exact point at which flashing starts and stops. In this case the reference voltage source includes a gas glow tube such as a neon tube 54 connected to a source of energy contained in the housing of the transducer 10. The circuit also includes a variable resistor 56 employed to calibrate the system to assure accuracy of the readings.

Figure 3:
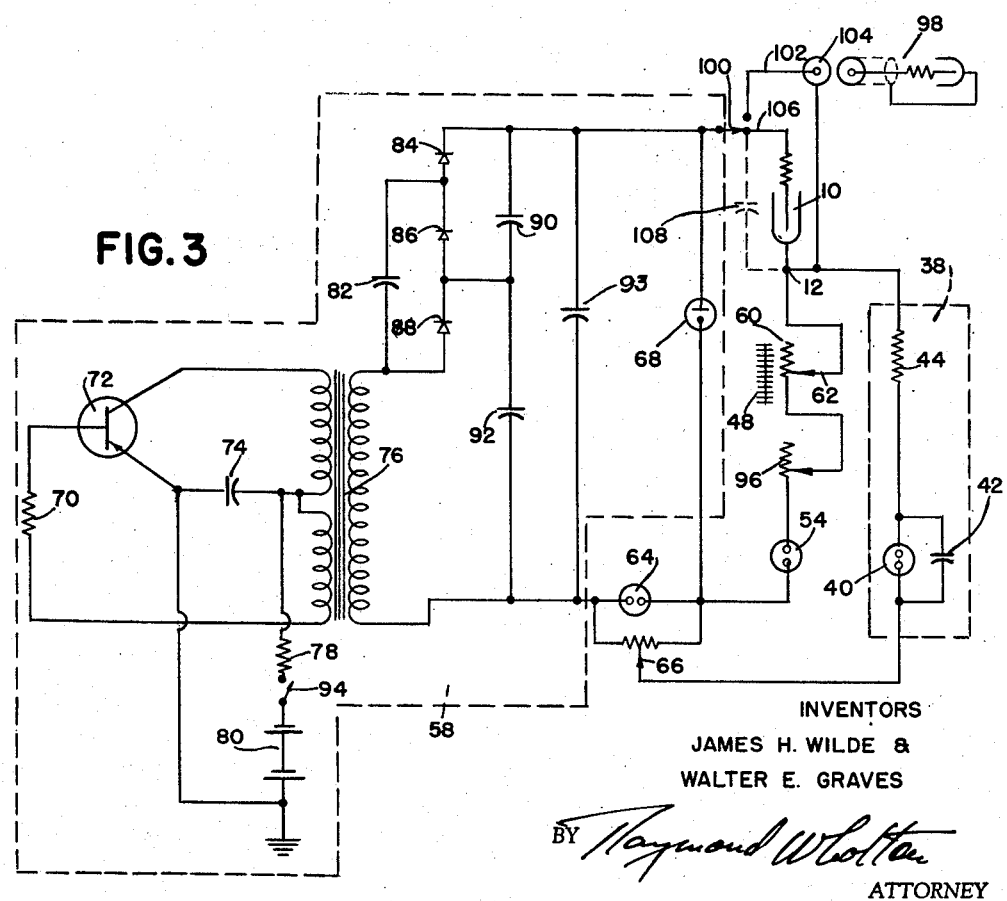
FIG. 3 is a more elaborate circuit diagram embodying the invention.

Referring to FIG. 3, there is depicted a high voltage power supply and voltage regulator circuit 58 interconnected with the nuclear radiation to electrical transducer 10, indicated as a halogen quenched Geiger-Muller tube and the discharge device circuit 38 associated with a variable resistor 60 and a gas glow tube 54 assuring a constant reference voltage. The output terminal 12 of the nuclear radiation to electrical transducer is connected to an adjustable tap 62 of the resistor 60 which is provided with the calibrated scale 48 to read the values of radiation to which the instrument is exposed. The neon lamp 54 always operates at its sustaining voltage. The neon glow lamp 40 together with its resistor 44 and capacitor 42 operates in the manner of a relaxation oscillator. An adjustable bias composed of a neon glow lamp 64 and a potentiometer 66 is employed to adjust the starting voltage of the discharge device 40 for purposes of calibration.

A voltage regulator 68 is employed to stabilize the high voltage against battery drop and load demand from the transducer 10. The high voltage supply circuit is of the blocking oscillator type including a resistor 70, transistor 72, capacitor 74, transformer 76, resistor 78 and battery 80, and a voltage tripler circuit including capacitor 82, diodes 84, 86 and 88, and capacitors 90, 92, 93. A switch 94 is interposed between the battery 80 and the resistor 78.

The resistor 96 in series with the resistor 60 is used for calibrating the upper end of the scale 48. An auxiliary probe 98 can be substituted for the transducer 10 by operating a single pole double-throw switch 100 which will connect the lead 102 of the auxiliary probe socket 104 and simultaneously disconnect the lead 106 of the transducer 10. A capacitor 108 can be connected across the terminals of the transducer 10 so that it will have the same characteristics as the external probe 98 which can be located at substantial distances from the remaining equipment to permit the monitoring of remotely located points.

Whereas the present invention has been illustrated with reference to a very limited number of embodiments, the variations that will be suggested to those skilled in the art are contemplated within the scope of the appended claims.

We claim:

1. A direct reading nuclear radiation instrument comprising a nuclear radiation- electrical transducer and a source of reference voltage having output terminals, a circuit containing a discharge device of predetermined breakdown voltage having an input terminal, a circuit interconnecting said terminals containing a resistor having a variable tap, and a calibrated direct reading scale adjacent said tap for indicating output values of said transducer at which breakdown of said discharge device occurs, at least a portion of said resistor being in series relationship with said discharge device and transducer.

2. A nuclear radiation instrument according to claim 1 wherein said transducer and source have their output terminals connected additively.

3. A nuclear radiation instrument according to claim 1 wherein said breakdown voltage exceeds said reference voltage.

4. A nuclear radiation instrument according to claim 1 wherein said resistor is a potentiometer having terminals connected to said transducer and source and a variable tap connected to said discharge device circuit.

5. A nuclear radiation instrument according to claim 1 wherein said resistor is interposed between said source terminal and a terminal common to said transducer and discharge device circuit.

6. A nuclear radiation instrument according to claim 1 wherein said discharge device is a gas glow tube.

7. A nuclear radiation instrument according to claim 1 wherin said discharge device circuit includes a capacitor connected in parallel circuit with said discharge device and a resistor connected in series with said parallel circuit.

8. A nuclear radiation instrument according to claim 1 wherein said source of reference voltage includes a circuit containing a gas glow tube.

References Cited by the Examiner
UNITED STATES PATENTS

| | | | |
|---|---|---|---|
| 2,496,886 | 2/50 | Molloy | 250—83 |
| 2,728,861 | 12/55 | Glass | 250—83.6 |
| 2,839,688 | 6/58 | Anton | 250—83.6 |
| 3,002,094 | 9/61 | Kompelien | 250—83.6 |
| 3,031,577 | 4/62 | Garbellano | 250—83.6 |
| 3,056,123 | 9/62 | Shamos | 250—83.6 |

RALPH G. NILSON, *Primary Examiner.*

JAMES W. LAWRENCE, *Examiner.*